(12) United States Patent
Kao et al.

(10) Patent No.: US 6,914,734 B1
(45) Date of Patent: Jul. 5, 2005

(54) COLOR WHEEL AND COLOR FILTER ASSEMBLY THEREOF

(75) Inventors: Po-Sung Kao, Taichung (TW); Shou-Chy Chia, Taichung (TW)

(73) Assignee: Asia Optical Co., Inc, Taichung (TW)

( * ) Notice: Subject to any disclaimer, the term of this patent is extended or adjusted under 35 U.S.C. 154(b) by 0 days.

(21) Appl. No.: 10/802,453

(22) Filed: Mar. 17, 2004

(30) Foreign Application Priority Data

Dec. 15, 2003 (TW) ........................................ 92135348 A

(51) Int. Cl.$^7$ .............................. G02B 5/22; G02B 7/00

(52) U.S. Cl. ........................ 359/892; 359/891; 348/743; 356/418; 353/84; 362/293

(58) Field of Search ................................ 359/891, 892, 359/885; 348/743; 356/418; 353/84; 362/293

(56) References Cited

U.S. PATENT DOCUMENTS

| 4,076,393 | A | * | 2/1978 | Bates .......................... 359/892 |
| 6,705,733 | B1 | * | 3/2004 | Yu et al. ........................ 353/84 |
| 2002/0003704 | A1 | * | 1/2002 | Ohmae et al. ............... 362/293 |
| 2004/0045397 | A1 | * | 3/2004 | Chang ....................... 74/573 R |

* cited by examiner

*Primary Examiner*—Leonidas Boutsikaris
(74) *Attorney, Agent, or Firm*—Thomas, Kayden, Horstemeyer & Risley

(57) ABSTRACT

A color filter assembly. The color filter assembly rotates around a central axis and includes a first carrier, a second carrier, a protrusion and a color filter. The first carrier has a first contact surface and a first joining portion protruding therefrom. The second carrier has a second contact surface and a second joining portion connected to the first joining portion. The protrusion is disposed on the first or second contact surface. The color filter has an opening with the protrusion inserted therein such that the color filter is fixed between the first and second carriers.

12 Claims, 9 Drawing Sheets

COLOR WHEEL AND COLOR FILTER ASSEMBLY THEREOF

BACKGROUND OF THE INVENTION

1. Field of the Invention

The present invention relates in general to a color wheel and in particular to a color filter assembly thereof providing improved balance and stability of rotation.

2. Description of the Related Art

Referring to FIG. 1, the conventional color wheel comprises a carrier 11, a color filter 12 and a motor 2. The color filter 12 is fixed to the carrier 11 by adhesive 13, wherein the carrier 11 is fixed to the shaft 22 at the center of the motor 2 with the cover 21. The motor 2 rotates the carrier 11 and the color filter 12 around central axis 10 via the shaft 22.

As mentioned, the color filter 12 is fixed to the carrier 11 by adhesive 13, however, the mass of adhesive 13 is difficult to control due to the flow property thereof such that the color wheel is unbalanced. Moreover, rotational instability and vibration may occur due to unbalanced mass distribution of the color wheel. Furthermore, the color filter 12 comprises a plurality of fan-shaped filter segments adhered to each other, hence, precise positioning thereof is difficult and the segments may be separated during rotation at high speed.

SUMMARY OF THE INVENTION

Accordingly, an object of the present invention is to provide a color wheel and color filter assembly thereof for improving balance and stability of rotation. The color filter assembly rotates around a central axis and comprises a first carrier, a second carrier, a protrusion and a color filter. The first carrier has a first contact surface and a first joining portion protruding therefrom. The second carrier has a second contact surface and a second joining portion connected to the first joining portion. The protrusion is disposed on the first or second contact surface. The color filter has an opening with the protrusion inserted therein such that the color filter is fixed between the first and second carriers.

DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

First Embodiment

Figure 1:
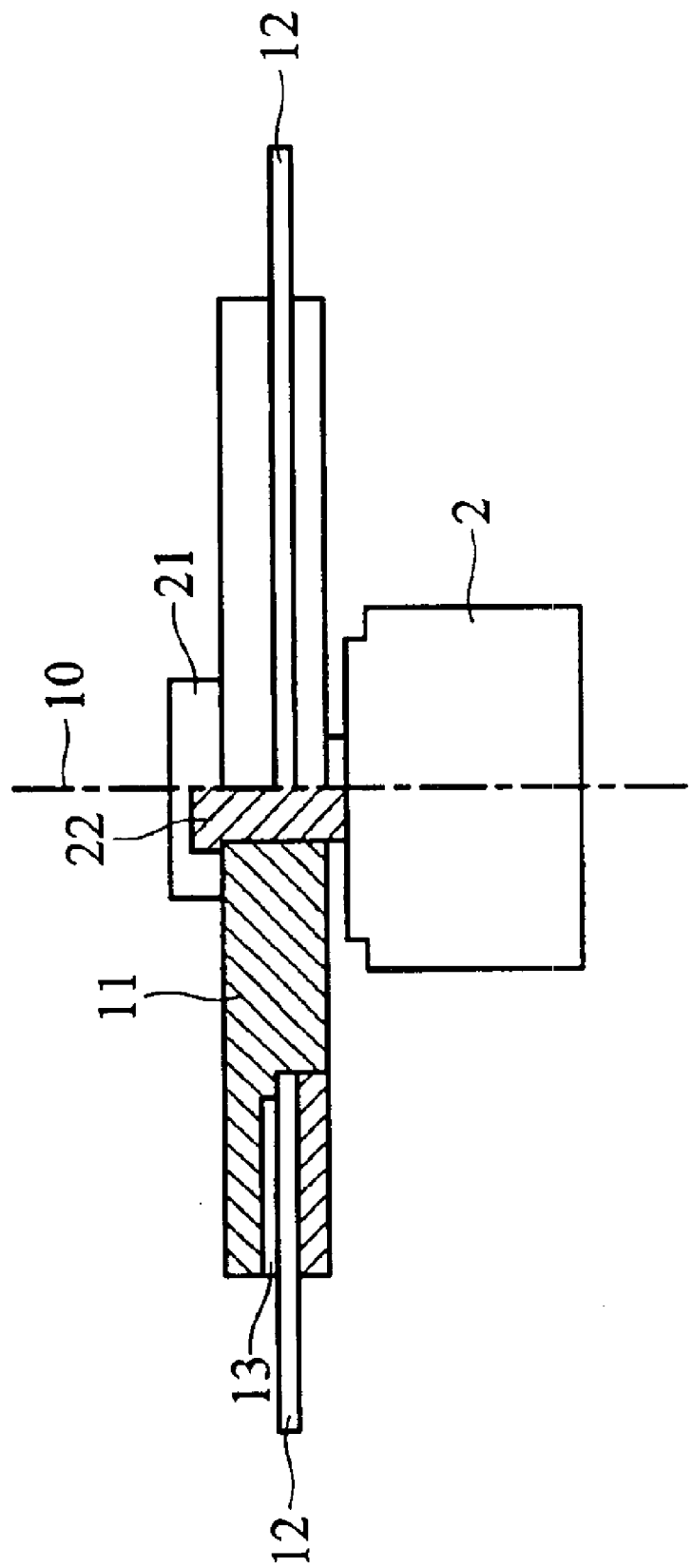
FIG. 1 is a perspective diagram of a conventional color wheel.
Figure 2:
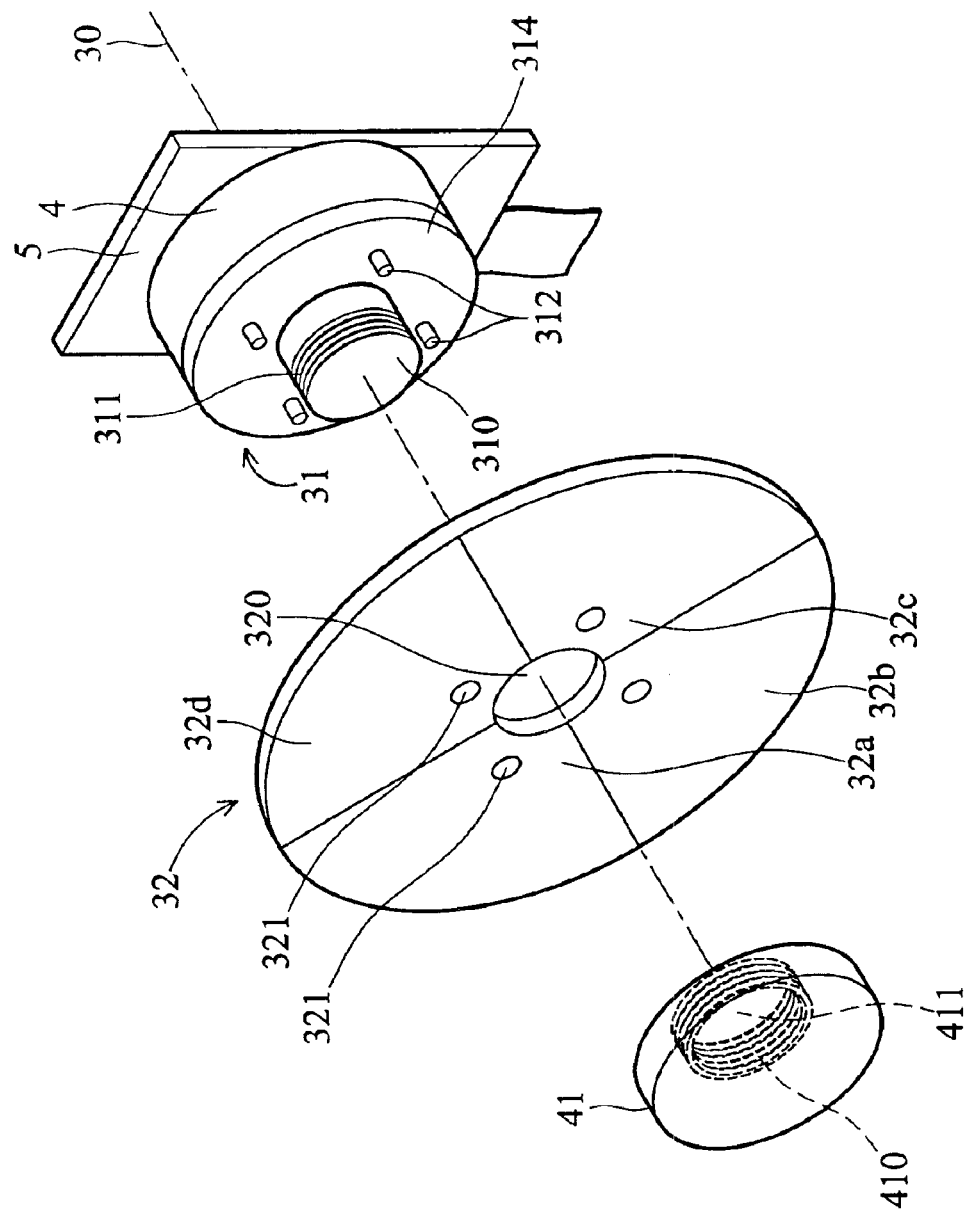
FIG. 2 is a perspective diagram of the first embodiment in accordance with the present invention.

Referring to FIG. 2, the color wheel has a motor 4 and a color filter assembly including a first carrier 31, a second carrier 41 and a color filter 32 comprising four filter segments 32a, 32b, 32c and 32d symmetrical to the central axis 30, wherein the filter segments 32a, 32b, 32c and 32d form an opening 320 at the center of the color filter 32.

As shown in FIG. 2, the first carrier 31 has a first joining portion 310 and a plurality of protrusions 312 projecting from the first contact surface 314, and each filter segment has an opening 321 corresponding to the protrusions 312. The second carrier 41 has a second joining portion 410 forming a depression 411 for receiving the first joining portion 310 along the central axis 30, wherein the first and second joining portions 310, 410 are threaded and joined thereby. The color filter 32 is firmly secured between the first and second carriers 31, 41 by seating the protrusions 312 in the corresponding openings 321 of the filter segments 32a, 32b, 32c, 32d and connecting the second joining portion 410 to the first joining portion 310.

Figure 3:
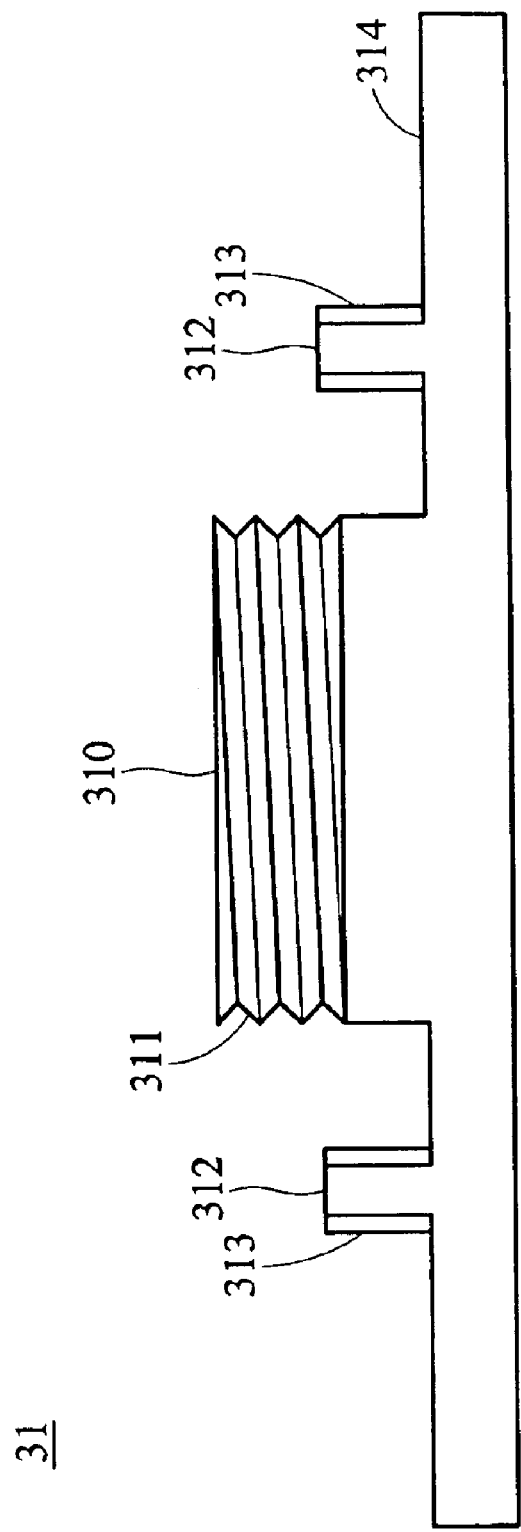
FIG. 3 is a perspective diagram of the first carrier based on FIG. 2 in accordance with the present invention.

Referring to FIG. 3, the first joining portion 310 is disposed at the center of the first carrier 31 and projects from the first contact surface 314. The protrusions 312 are parallel and disposed around the first joining portion 310 and inserted into the corresponding openings 321 of the filter segments 32a, 32b, 32c and 32d such that the color filter 32 is fixed to the first carriers 31 for preventing separation during rotation. Furthermore, each protrusion 312 is enclosed by a flexible material 313 deformed when joining the opening 321 to firmly secure the color filter 32 on the first carrier 31.

Second Embodiment

Figure 4:
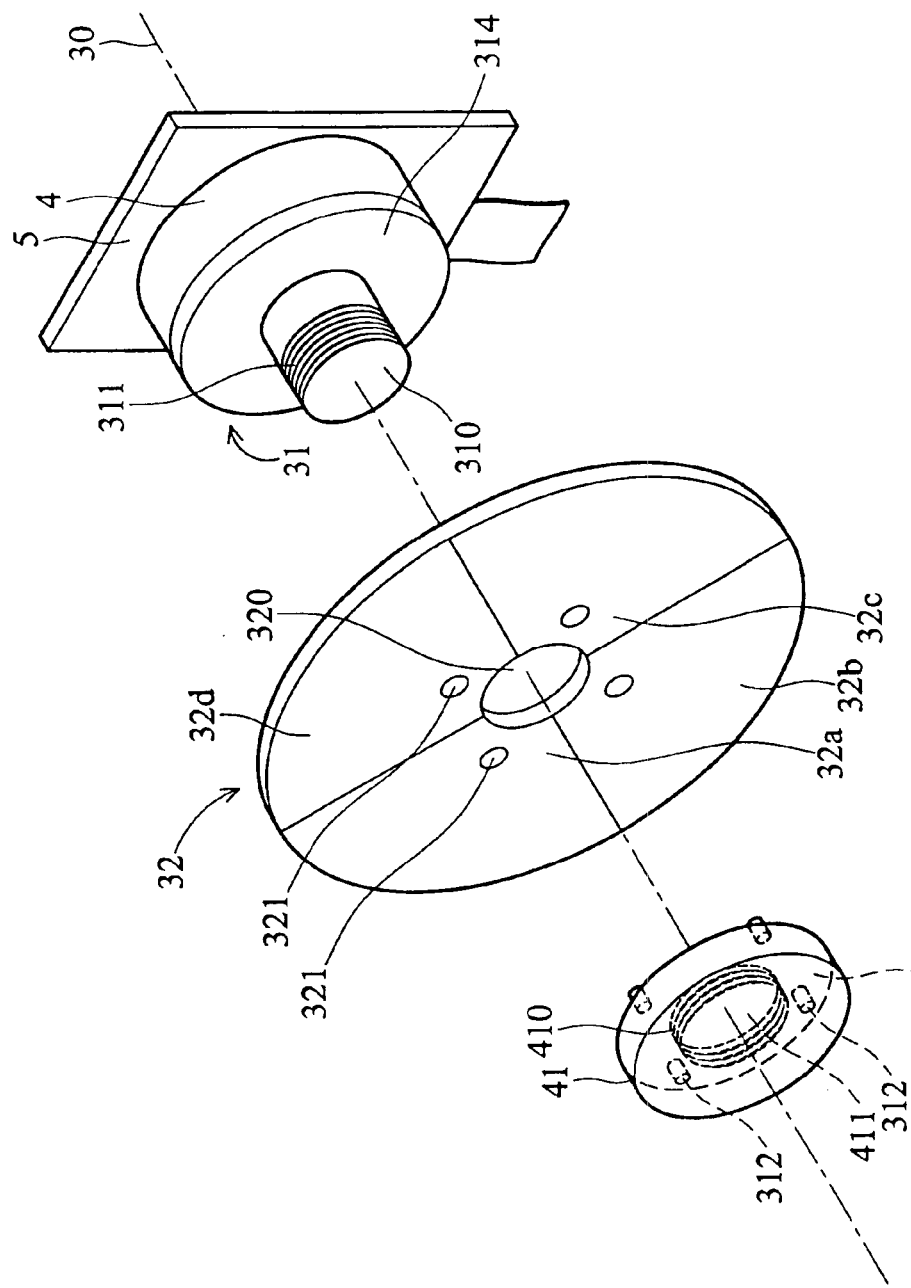
FIG. 4 is a perspective diagram of the second embodiment in accordance with the present invention.

Referring to FIG. 4, the color filter 32 comprises four filter segments 32a, 32b, 32c and 32d symmetrical to the central axis 30 of the color wheel. As mentioned, the filter segments 32a, 32b, 32c and 32d form an opening 320 at the center of the color filter 32. The second carrier 41 has a plurality of protrusions 312 projecting from the second contact surface 414, and each filter segment has an opening 321 corresponding to the protrusions 312. Moreover, the second carrier 41 has a second joining portion 410 forming a depression 411 for receiving the first joining portion 310 along the central axis 30. The first and second joining portions 310, 410 are threaded and joined thereby. The color filter 32 is thereby precisely positioned and firmly secured between the first and second carriers 31, 41 by seating the protrusions 312 through the corresponding openings 321 of the filter segments 32a, 32b, 32c, 32d and joining the second joining portions 410 to the first joining portions 310.

Figure 5:
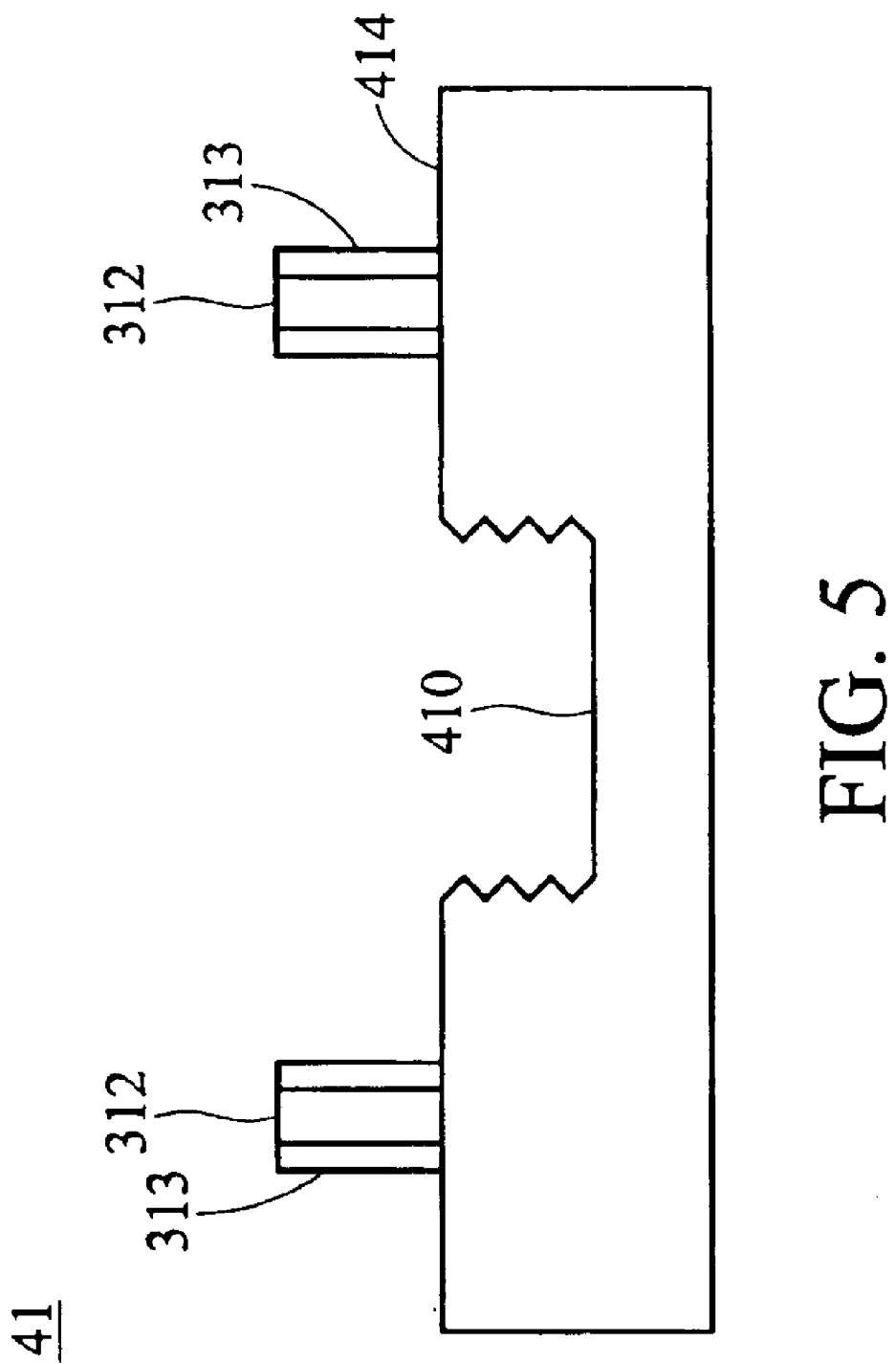
FIG. 5 is a perspective diagram of the second carrier based on FIG. 4 in accordance with the present invention.

As shown in FIG. 5, the second joining portion 410 is at the center of the second carrier 41 and depressed from the second contact surface 414. A plurality of protrusions 312 project from the second contact surface 414 and are inserted into the corresponding openings 321 of the filter segments 32a, 32b, 32c such that the color filter 32 is fixed thereto for preventing separation during rotation. Furthermore, each protrusion 312 is enclosed by a flexible material 313 deformed when joining the opening 321 to firmly secure the color filter 32 on the second carrier 41.

Third Embodiment

Figure 6:
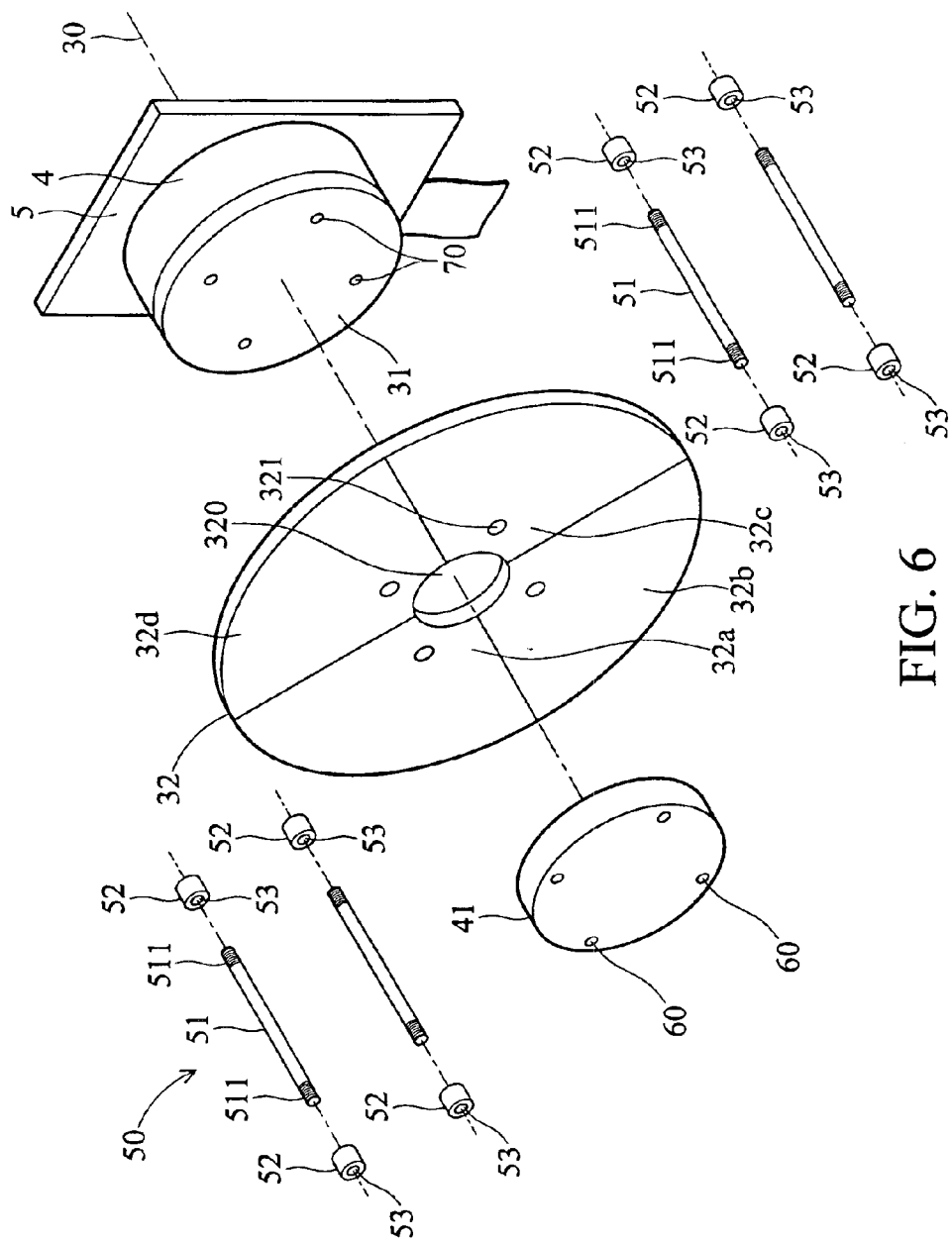
FIGS. 6 and 7 are perspective diagrams of the third embodiment in accordance with the present invention.
Figure 7:
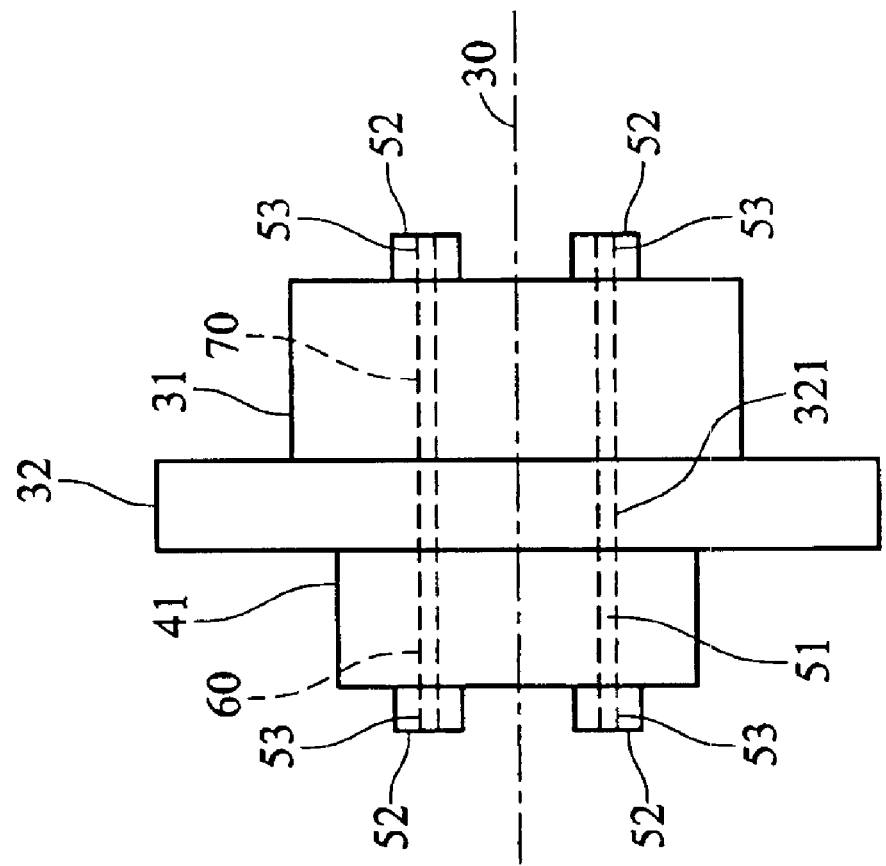

Referring to FIG. 6, the color wheel has a motor 4 and a color filter assembly including a first carrier 31, a second carrier 41, a securing member 50 and a color filter 32 comprising four filter segments 32a, 32b, 32c and 32d symmetrically surrounding the central axis 30 and forming an opening 320 at the center of the color filter 32. In FIGS. 6 and 7, the first carrier 31 has a plurality of first holes 70, and the second carrier 41 has a plurality of corresponding second holes 60. The securing member 50 comprises a plurality of rods 51 and abutting members 52 connected thereto. As shown in FIG. 7, the rods 51 pass through the second holes 60, the openings 321 and the first holes 70 with the abutting members 52 secured at both ends, and the color filter 32 is thereby firmly fixed between the first and second carriers 31, 41. Particularly, the abutting members 52 are threaded on the surface of the hole 53, and the rods 51 are also threaded corresponding thereto for secure connection.

Fourth Embodiment

Figure 8:
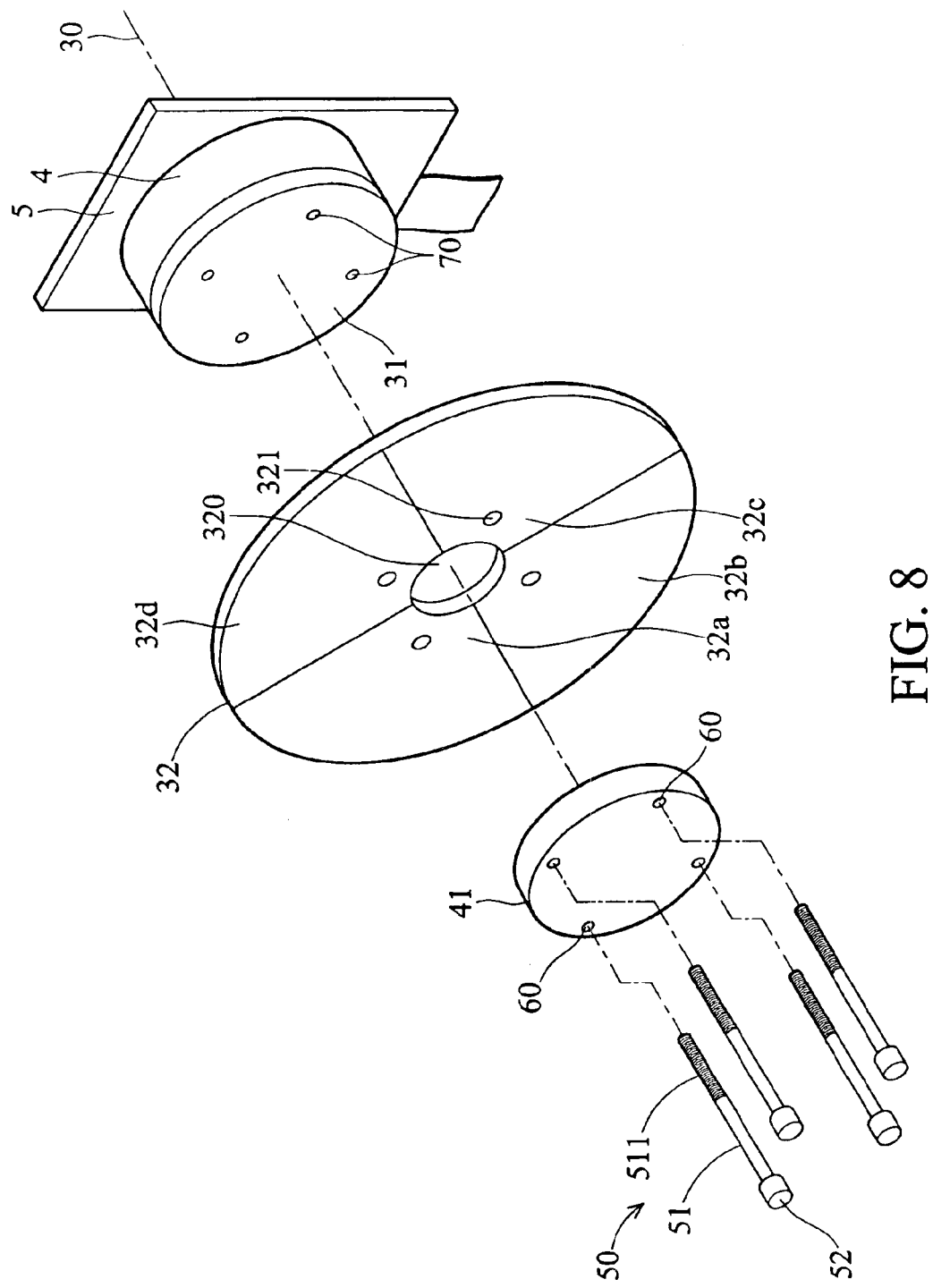
FIGS. 8 and 9 are perspective diagrams of the fourth embodiment in accordance with the present invention.
Figure 9:
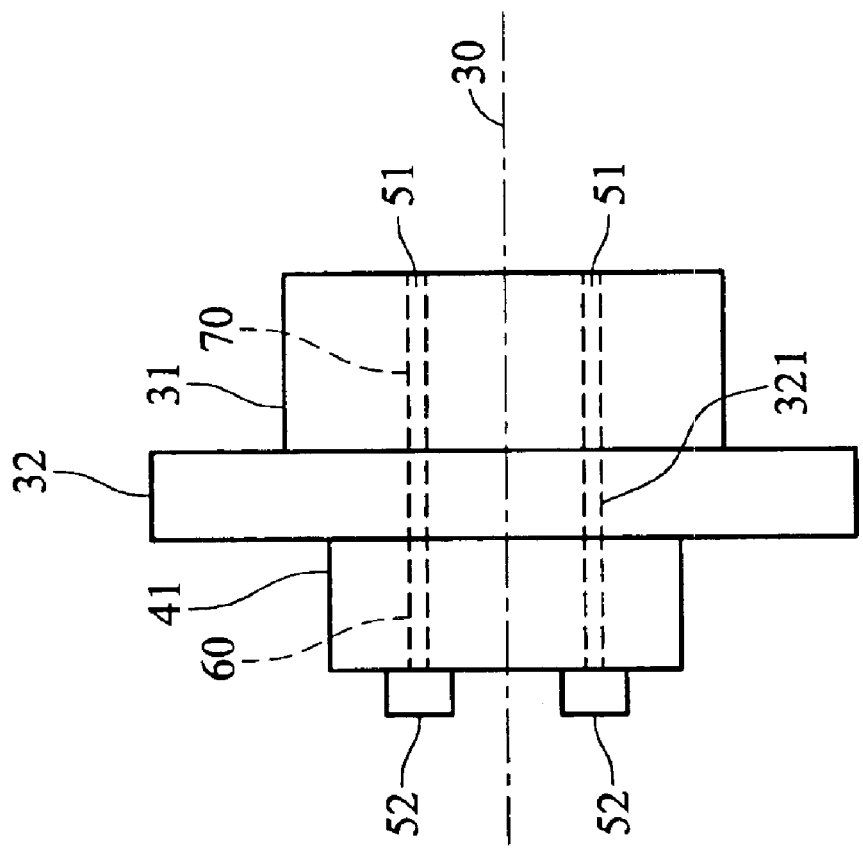

Referring to FIG. 8, the color wheel has a motor 4 and a color filter assembly including a first carrier 31, a second carrier 41, a securing member 50 and a color filter 32 comprising four filter segments 32a, 32b, 32c and 32d symmetrically surrounding the central axis 30 and forming an opening 320 at the center of the color filter 32. In FIGS. 8 and 9, the first carrier 31 has a plurality of first holes 70, and the second carrier 41 has a plurality of corresponding second holes 60. The securing member 50 comprises a plurality of threaded rods 51 with integrally formed abutting members 52. As shown in FIG. 9, the rods 51 pass through the second holes 60, the openings 321, and are inserted into the first holes 70 and sequentially tightened. The color filter 32 is thereby firmly secured between the first and second carriers 31, 41.

As shown in FIG. 8, the color wheel of the present invention further provides a circuit board 5 connected to the motor 4 for supplying driving power. The motor 4 rotates the first carrier 31, the second carrier 41 and the color filter 32 around the central axis 30.

In summary, the present invention provides a color wheel utilized for an optical device such as a DLP projector. The color filter 32 can be fixed to the first carrier 31 by inserting the protrusions 312 into the openings 321 according to FIG. 2. Furthermore, the first and second joining portions 310, 410 are connected such that the color filter 32 is further firmly secured between the first and second carriers 31, 41 thus preventing separation during rotation. As shown in FIG. 6, the aforementioned protrusions 312 can be represented by the rods 51 and the abutting members 52. The rods 51 are sequentially inserted through the second holes 60, the openings 321 and the first holes 70 such that the color filter 32 is firmly secured between the first and second carriers 31, 41. The present invention has simple structure capable of improving balance and stability of rotation.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A color filter assembly rotating around a central axis thereof, comprising:
   a first carrier having a first contact surface and a first joining portion protruding wherefrom;
   a second carrier having a second contact surface and a second joining portion connected to the first joining portion, wherein the first and second joining portions are threaded and joined thereby;
   a protrusion disposed on the first or second contact surface; and
   a color filter having a receiving portion with the protrusion inserted therein such that the color filter is fixed between the first and second carriers.

2. The color filter assembly as claimed in claim 1, wherein the protrusion is enclosed by a flexible material.

3. A color filter assembly rotating around a central axis thereof, including:
   a first carrier having a first contact surface and at least a first hole disposed thereon;
   a second carrier having a second contact surface and at least a second hole disposed thereon;
   a color filter disposed between the first and second contact surface, having at least an opening disposed thereon; and
   a securing member having at least a rod fastened through the first hole, the opening and the second hole such that the color filter is fixed between the first and second carriers.

4. The color filter assembly as claimed in claim 3, wherein the securing member has two abutting members joined to the rod for securing the color filter between the first and second carriers.

5. A color filter assembly rotating around a central axis thereof, including:
   a first carrier having a first contact surface and at least a first hole formed therein;
   a second carrier having a second contact surface and at least a second hole disposed thereon;
   a color filter disposed between the first and second contact surfaces, having at least an opening formed therein; and
   a securing member having at least a rod inserted through the first hole, the opening and the second hole and at least an abutting member connected to the rod for securing the color filter between the first and second carriers.

6. The color filter assembly as claimed in claim 5, wherein the rod, the first hole, the opening and the second hole are threaded for joining the color filter, the first and second carriers.

7. A color wheel, including:
   a color filter assembly of claim 1; and
   a rotator having a shaft rotating the color filter assembly around the central axis.

8. The color wheel as claimed in claim 7, wherein the protrusion is enclosed by a flexible material.

9. A color wheel, including:
   a color filter assembly of claim 3; and
   a rotator having a shaft rotating the color filter assembly around the central axis.

10. The color wheel as claimed in claim 9, wherein the securing member has two abutting members threaded and joined to the rod for securing the color filter between the first and second carriers.

11. A color wheel, including:
    a color filter assembly of claim 5; and
    a rotator having a shaft rotating the color filter assembly around the central axis.

12. The color filter assembly as claimed in claim 11, wherein the rod, the first hole, the opening and the second hole are threaded for securing the color filter between the first and second carriers.

* * * * *